G. T. MILLER.
NUT AND BOLT LOCK.
APPLICATION FILED DEC. 20, 1915.

1,226,354.

Patented May 15, 1917.

Inventor
George T. Miller
By Geo. P. Kimmel.
Attorney

UNITED STATES PATENT OFFICE.

GEORGE T. MILLER, OF WILLIAMS, CALIFORNIA.

NUT AND BOLT LOCK.

1,226,354.

Specification of Letters Patent.  Patented May 15, 1917.

Application filed December 20, 1915. Serial No. 67,793.

*To all whom it may concern:*

Be it known that I, GEORGE T. MILLER, a citizen of the United States, residing at Williams, in the county of Colusa and State of California, have invented certain new and useful Improvements in Nut and Bolt Locks, of which the following is a specification.

This invention relates to improvements in nut and bolt locks.

The object of my invention is to provide a novel nut and bolt lock of an extremely economical and simple construction whereby a conventional nut and bolt may be securely locked together by the use of my device and without any alteration in the ordinary type of nut and bolt.

Furthermore, my device can be manufactured at a very low cost, and may be used many times without impairing its efficiency, nor does it injure the nut or bolt so that they cannot be used again. It is therefore an effective device the use of which will be a real economy.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Referring now to the drawings, which are merely illustrative of my invention,

Figure 1:
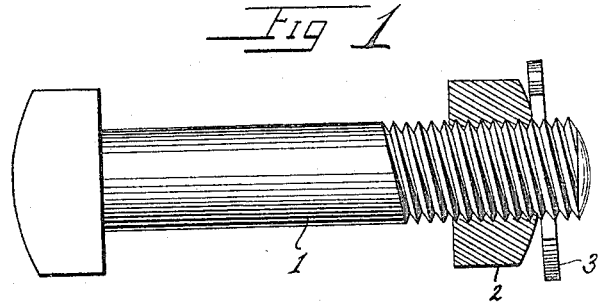
Figure 1 is a side elevation of a bolt with a nut section so as to show the relative position of the lock in engagement with the threaded end of the bolt.
Figure 2:
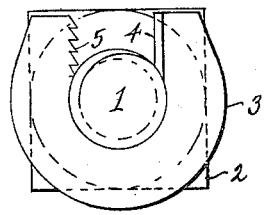
Fig. 2 is an end elevation of the same.
Figure 3:
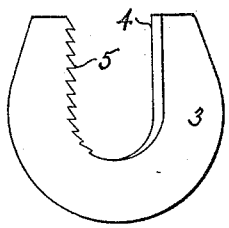
Fig. 3 is a detail side elevational view of my novel lock.

Referring further to the drawings, wherein similar reference characters designate similar parts throughout the respective views, 1 designates a conventional type of bolt having a nut 2 mounted thereon. A lock member consists of a flattened substantially U-shaped member 3, formed with a knife edge 4 upon the inner edge of one of the arms of said member and a toothed edge 5 upon the inner edge of the other of said arms, the said tooth edge extending into the central portion of the U-shaped member, said member being made preferably of steel so as to permit of a slight distension and spring-like grip upon the bolt when placed in operative position.

In using my lock, the nut 2 is first securely screwed upon the bolt 1 and the lock is then driven upon the threaded end of the bolt adjacent the outer face of the nut. The knife edge 4 is adapted to engage with the convolutions of the threaded portion of the bolt to guide the lock securely against the face of the nut, while the toothed edge 5 will so engage with the opposite side of a bolt as to retain the member securely thereon.

The utility, adaptability, and advantages of my improved form of nut and bolt lock being obvious, it is unnecessary to further enlarge upon the same herein.

Having now described and pointed out the new and useful features of my invention, I do not limit myself to the shape of certain parts, where the shape is not essential, nor do I restrict myself to the exact details of construction shown and described, but mean and intend to claim all equivalents and variations thereof, not departing in principle from my invention, and falling within the purview of the appended claims.

What I claim as my invention and desire to secure by Letters Patent is:

1. A nut and bolt lock consisting of the combination of a flattened substantially U-shaped member, a plurality of teeth formed upon the edge of one of the arms of said U-shaped member, with the inner end of one of the arms of said member being formed with the knife edge.

2. A nut and bolt lock consisting of a flattened U-shaped member, the inner edge of one of the arms of said member being formed with a knife edge, and the other inner edge provided with a plurality of teeth, the said teeth and cutting surface meeting centrally of the throat of said U-shaped member, the teeth extending on the throat providing means for embodying and gripping a portion of the bolt for a purpose specified.

In testimony whereof I affix my signature hereto.

GEORGE T. MILLER.

Copies of this patent may be obtained for five cents each, by addressing the "Commissioner of Patents, Washington, D. C."